United States Patent
Barford

(10) Patent No.: US 6,719,816 B2
(45) Date of Patent: Apr. 13, 2004

(54) ARTIFICIAL FIRELOG WITH SODIUM BICARBONATE ADDITIVE

(75) Inventor: Eric D. Barford, Stockton, CA (US)

(73) Assignee: Duraflame, Inc., Stockton, CA (US)

( * ) Notice: Subject to any disclaimer, the term of this patent is extended or adjusted under 35 U.S.C. 154(b) by 0 days.

(21) Appl. No.: 10/134,161

(22) Filed: Apr. 25, 2002

(65) Prior Publication Data

US 2002/0194779 A1 Dec. 26, 2002

Related U.S. Application Data

(60) Provisional application No. 60/288,368, filed on May 3, 2001.

(51) Int. Cl.[7] .................................................. C10L 5/00
(52) U.S. Cl. .......................... 44/535; 44/575; 44/580; 44/590
(58) Field of Search .................... 44/535, 575, 580, 44/590

(56) References Cited

U.S. PATENT DOCUMENTS

| | | |
|---|---|---|
| 2,876,084 A | 3/1959 | Leggin |
| 3,297,419 A | 1/1967 | Eyre, Jr. et al. ................. 44/6 |
| 3,843,336 A | 10/1974 | Messman ....................... 44/25 |
| 4,040,796 A | 8/1977 | Vincent et al. ................. 44/14 |
| 4,102,653 A | 7/1978 | Simmons et al. |
| 4,326,854 A | 4/1982 | Tanner ....................... 44/10 B |
| 4,333,738 A | 6/1982 | Schrader .................... 44/15 B |
| 4,883,498 A | 11/1989 | MacIsaac ..................... 44/532 |
| 5,868,804 A | 2/1999 | Williams et al. .............. 44/535 |
| 6,017,373 A | 1/2000 | Frisch ......................... 44/535 |
| 6,136,054 A | 10/2000 | Tutupalli et al. .............. 44/535 |

FOREIGN PATENT DOCUMENTS

FR 2487374 * 1/1982

OTHER PUBLICATIONS

J.E. Houck et al. *Comparison of Air Emissions Between Cordwood and Wax–Sawdust Firelogs Burned in Residential Fireplaces*, Oct. 2000, p. 1–15, Proceedings of AWMA and PNIS International Specialty PConference, Proceedings of The Ninth Biennial Bioenergy Conference.

International Search Report dated Oct. 8, 2002 in PCT/US02/13762.

* cited by examiner

Primary Examiner—Cephia D. Toomer
(74) Attorney, Agent, or Firm—Koppel, Jacobs, Patrick & Heybl

(57) ABSTRACT

An artificial firelog is provided comprising combustible cellulosic material, a combustible wax binder and an amount of sodium bicarbonate effective to reduce emissions of particulate matter (PM) and carbon monoxide (CO). The sodium bicarbonate comprises about 1% to about 10% by weight of the artificial firelog. Preferably, the sodium bicarbonate comprises about 2% to about 5% by weight of the artificial firelog. Besides substantially reducing PM and CO emissions during combustion of the artificial firelog, the undesirable odor associated with combustion of the wax binder is decreased and the firelog's total burn time is extended. Moreover, the sodium bicarbonate increases the "poke resistance" of the firelog making the log suitable for outdoor use and a natural appearing white ash develops during the course of combustion.

4 Claims, 1 Drawing Sheet

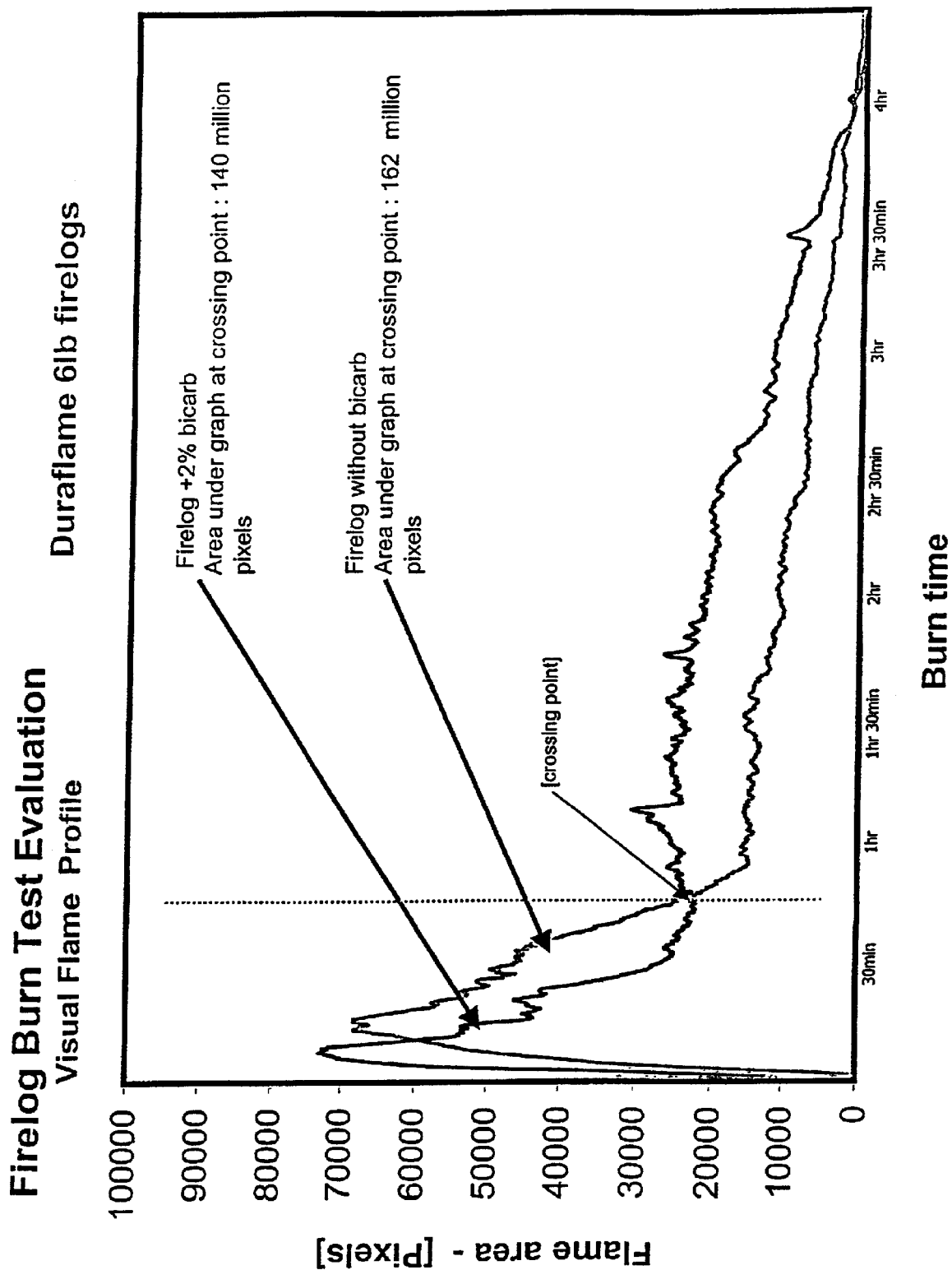

ARTIFICIAL FIRELOG WITH SODIUM BICARBONATE ADDITIVE

CROSS REFERENCE TO RELATED APPLICATION

This application claims the benefit of U.S. provisional application Serial No. 60/288,368 filed May 3, 2001.

BACKGROUND OF THE INVENTION

1. Field of the Invention

The present invention relates generally to artificial firelogs and particularly to artificial firelogs containing additives for improving the burn characteristics of the logs.

2. Description of the Related Art

Fireplaces have been used in homes over the years for providing heat as well as to provide a desired ambience. While wood and coal have been the primary fuels for burning in fireplaces, there is an increasing demand for manufactured or artificial fireplace logs. These logs are easier to purchase and store, provide better Btu/lb value than wood or coal, are easier to light, safer to use with virtually no maintenance during burning, and can be used to build fires of a known duration, generally from 2 hours to more than 6 hours.

Artificial firelogs are typically manufactured by combining a carrier material, usually particles of cellulosic origin, with a combustible binder/fuel. The cellulosic material may be sawdust, or a mixture of sawdust with other combustible materials of varying proportion. The binder typically consists of a suitable blend of waxes, either alone or in combination with other combustible materials. Additives imparting desired combustion characteristics, appearance, and other attributes may be combined with the basic ingredients. Following thorough mixing of the ingredients, the resulting mixture is formed into suitable, log-like shapes by extrusion, molding or compression, in either a batch or continuous process.

U.S. Pat. Nos. 3,297,419; 6,017,373; 6,136,054; 5,868,804; 4,333,738; 4,326,854; 3,843,336; and 4,040,796, incorporated herein by reference in their entireties, provide examples of known artificial firelog compositions, configurations and methods of manufacture.

While existing artificial firelog compositions can perform substantially as expected, there continues to be a need for further improvements in the burn characteristics of such compositions. For example, although a number of studies have shown that artificial (wax-sawdust) firelogs provide a substantial reduction in particulate matter (PM) and carbon monoxide (CO) emissions as compared with natural cordwood logs, there is a need to provide artificial firelogs that are still more environmentally-responsible, that is, firelogs which produce even lower levels of PM and CO both of which are classified by the Environmental Protection Agency as federal criteria pollutants.

The majority, by far, of PM emissions from the combustion of artificial firelogs (true as well for natural logs) are smaller than 2.5 microns in diameter, that is, they are classified as $PM_{2.5}$ particles regarded as the most problematic from an air pollution standpoint.

CO is an odorless, highly toxic gas and residential indoor CO levels are of particular concern because of a trend toward the construction of airtight, energy-efficient residences. The National Ambient Air Quality Standard (NAAQS) for CO is 9 parts per million (ppm) in an averaging period of 8 hours and 35 ppm in a 1-hour averaging period.

Accordingly, artificial firelogs that further reduce PM and CO emissions are highly desirable.

Besides generating PM and CO emissions, a burning artificial firelog containing one or more flammable wax binders often produces a disagreeable, waxy odor in the flue smoke and gases. The elimination of such an undesirable odor is another goal of manufacturers of artificial firelogs.

It would also be desirable to increase the length of firelog burn time, and to improve the aesthetic appearance of a burning artificial firelog so that it more nearly resembles a natural wood log during combustion, including the development of white ash as the burn progresses.

SUMMARY OF THE INVENTION

In accordance with the broad principles of the present invention, there is provided an artificial firelog comprising combustible cellulosic materials, a combustible binder and an amount of sodium bicarbonate effective to reduce emissions of particulate matter and carbon monoxide during combustion of the firelog. In accordance with a specific, exemplary embodiment of the invention, the sodium bicarbonate comprises about 1% to about 10% by weight of the artificial firelog. Preferably, the sodium bicarbonate comprises about 2% to about 5% by weight of the artificial firelog.

The addition of sodium bicarbonate has been found to provide a substantial reduction in PM and CO emissions during combustion of an artificial firelog, increase the burn time of the firelog, and reduce the "waxy malodor" from the flue smoke and gases. In addition, the "poke resistance" of the firelog, that is, its resistance to collapsing when poked, increases with the amount of sodium bicarbonate ingredient, making the firelog of the invention particularly suitable for outdoor use. Still further, the aesthetic appearance of the burning log is substantially improved, the sodium bicarbonate giving a "hardwood" or regular "cordwood" appearance to the log, with charring and a natural appearing white ash developing during the course of combustion.

BRIEF DESCRIPTION OF THE DRAWINGS

Further objects, features and advantages will become apparent from the detailed description of the invention, below, when read in conjunction with the accompanying drawing FIGURE comprising a graph plotting flame area (in pixels) as a function of burn time for an artificial firelog with 2% by weight of sodium bicarbonate and for a reference artificial firelog without sodium bicarbonate.

DETAILED DESCRIPTION OF THE INVENTION

Artificial firelogs in accordance with the present invention may be made of any of the many known combinations of flammable cellulosic materials and binders, with various optional chemical additives; the present invention is not limited to any particular basic artificial firelog formulation.

Thus, artificial firelogs of the invention may be manufactured from a broad range of flammable cellulosic components in combination with a binder, with or without other additives. Typical flammable cellulosic components include wood particles, pulp, shavings or chips, sawdust, ground bark, shredded paper or cardboard, waxed cardboard, charcoal powder, spagnum moss, and agricultural waste materials such as straw, bagasse, grass clippings, leaves, cotton linter, rice hulls, peanut or other nut shells and coffee grounds. The binder is typically a flammable wax such as paraffin or slack wax, flammable vegetable oils such as stearic and/or paimitic acid or other fatty acids or esters. Numerous other known combustible components could be used.

Other additives may include chemicals designed to color or otherwise modify or retard the flame, add aroma or change the burning characteristics of the artificial firelog to more closely mimic the burning of natural logs, as well as various kinds of natural seeds and/or particulate industrial byproducts, such as coke, for simulating the crackling sounds produced by a burning natural log. A broad range of known firelog cross sectional shapes may also be employed. For example, one or more longitudinally extending grooves may be provided to accelerate ignition. Still further, as is well known, the artificial firelogs may be enveloped in outer wrappers for protecting the firelog and facilitating its ignition. Artificial firelogs in accordance with the present invention may make use of the materials, configurations and other attributes summarized above; the foregoing list is not intended to limit the composition, configuration, or other attributes of flammable artificial firelogs described and claimed herein.

Pursuant to the present invention, included in the artificial firelog is an additive in the form of sodium bicarbonate. The sodium bicarbonate limits emissions of PM and CO during combustion of the firelog, increases the burn time of the firelog, and reduces the waxy malodor from the flue smoke and gases. In addition, the aesthetic appearance of the burning log is substantially improved, giving a "hardwood" or regular "cordwood" appearance to the log, with a white ash developing during the progress of the burn.

An artificial firelog pursuant to the invention may comprise 40–60% w/w flammable wax binder and 60–40% w/w combustible cellulosic material to which is added sodium bicarbonate in the amount of about 1% w/w to about 10% w/w. Preferably, the sodium bicarbonate content of the firelog ranges from about 2% w/w to about 5% w/w.

| Constituent | Artificial test firelog | Reference firelog |
| --- | --- | --- |
| Microcrystalline or paraffin wax | 58% w/w | 58% w/w |
| Wood fiber | 40% w/w | 42% w/w |
| Sodium bicarbonate | 2% w/w | [None] |

These firelogs were burned in a standard fireplace under substantially the same burning conditions. Emissions of $PM_{2.5}$ particles and CO were measured using the test methods and protocols described in Houck, James E., et al., "Comparison of Air Emissions between Cordwood and Wax-Sawdust firelogs Burned in Residential Fireplaces" in Proceedings of AWMA and PNIS International Speciality Conference: Recent Advances in the Science and Management of Air Toxics, Banff, Alberta, April 2000, and in Proceedings of The Ninth Biennial Bioenergy Conference, Buffalo, N.Y. October 2000, a copy of which is attached.

Flame area (which is a measure of flame intensity) was measured by means of a monochromic digital camera connected to a computer and set at a video frame rate of 80 frames per minute. The total number of pixels in each frame was counted by the computer and these counts were plotted as a function of burn time, as shown in the accompanying drawing. The contrast was set so that above a first threshold the image is all white and below a second threshold, the image is all black. In this way, only flame pixels are counted; reflections and other artifacts are not.

The following chart shows the results of the PM and CO emissions burn tests[1]:

| | Firelog with 2% sodium bicarbonate | Reference firelog without sodium bicarbonate | Difference (%) |
| --- | --- | --- | --- |
| Log Weight [lb] | 6.20 | 6.14 | |
| PM [gm/hr] | 10.26 | 14.85 | −31 |
| PM [gm/kg] | 24.07 | 35.76 | −32 |
| CO [gm/hr] | 24.8 | 41.9 | −40 |

1. Tests performed on single firelog burns. Tests started at ignition and terminated when CO in dilution tunnel reached 9 ppm.

The table shows a comparison of total PM and CO between logs with and without sodium bicarbonate. It will be seen that substantial reductions in PM and CO emissions were realized with the inclusion of sodium bicarbonate in the artificial firelog.

The accompanying drawing FIGURE shows a graph plotting flame area (in pixels) as a function of burn time for the test firelog and for the reference firelog. The graph indicates the effect sodium bicarbonate has on reducing the flame intensity for the first 45 minutes of the burn. It is during this period of strong flames that firelogs generate the most particulates. Sodium bicarbonate reduces the start up flame strength and hence emissions and as can be seen, lifts the remainder of the burn flame profile. After the first hour or so, a firelog produces less PM as the lower amount of fuel driven off receives adequate oxygen for a more complete and cleaner oxidation of hydrocarbons. The presence of sodium bicarbonate also seems to provide a more guaranteed combustion of all the combustible volatiles, as the "tail end smoking"—a secondary particulate emission period—often seen with firelogs is mostly prevented.

It is believed that the increased burn times of artificial firelogs including sodium bicarbonate as a constituent is due to the decomposition of the sodium bicarbonate in the presence of heat, yielding—besides sodium carbonate or soda ash—water and carbon dioxide which tend to suppress the aggressiveness of the burn, particularly during the early phase thereof. The soda ash is seen as a white ash contributing to a more realistic appearance as the firelog is consumed.

While illustrative embodiments of the invention have been described, numerous variations and alternate embodiments will occur to those skilled in the art. Such variations and alternate embodiments are contemplated, and can be made without departing from the spirit and scope of the invention as defined by the appended claims.

We claim:

1. An artificial firelog comprising from about 40% w/w to about 60% w/w flammable wax binder, from about 60% w/w to about 40% w/w flammable cellulosic material and from about 1% w/w to about 10% w/w of sodium bicarbonate.

2. An artificial firelog, as defined in claim 1, in which the sodium bicarbonate comprises from about 2% w/w to about 5% w/w of the artificial firelog.

3. An artificial firelog comprising, in combination:
(a) a combustible cellulosic material;
(b) a combustible wax binder; and
(c) sodium bicarbonate,
wherein the relative proportions of the ingredients comprise, by weight, from about 40 to about 60% of (a), from about 40 to about 60% of (b) and from about 1 to about 10% of (c), for 100% of [(a)+(b)+(c)].

4. The artificial firelog of claim 3, wherein the relative proportion of sodium bicarbonate comprises, by weight, from about 2% to about 5%.

* * * * *